(12) United States Patent
Zhang et al.

(10) Patent No.: US 9,967,094 B2
(45) Date of Patent: May 8, 2018

(54) DATA PROCESSING SYSTEM WITH SECURE KEY GENERATION

(71) Applicant: FREESCALE SEMICONDUCTOR, INC., Austin, TX (US)

(72) Inventors: Shayan Zhang, Cedar Park, TX (US); Mohit Arora, Austin, TX (US)

(73) Assignee: NXP USA, Inc., Austin, TX (US)

( * ) Notice: Subject to any disclaimer, the term of this patent is extended or adjusted under 35 U.S.C. 154(b) by 304 days.

(21) Appl. No.: 14/835,501

(22) Filed: Aug. 25, 2015

(65) Prior Publication Data

US 2017/0063546 A1 Mar. 2, 2017

(51) Int. Cl.
*G06F 21/00* (2013.01)
*H04L 9/08* (2006.01)
*G06F 7/58* (2006.01)
*G06F 21/73* (2013.01)
*G06F 21/74* (2013.01)
*G06F 21/79* (2013.01)

(Continued)

(52) U.S. Cl.
CPC ............ *H04L 9/0877* (2013.01); *G06F 7/588* (2013.01); *G06F 21/73* (2013.01); *G06F 21/74* (2013.01); *G06F 21/79* (2013.01); *G06F 2221/2105* (2013.01); *G11C 7/24* (2013.01); *G11C 29/50012* (2013.01); *G11C 2029/4402* (2013.01)

(58) Field of Classification Search
None
See application file for complete search history.

(56) References Cited

U.S. PATENT DOCUMENTS 7,206,797 B2 * 4/2007 Gressel .................. G06F 7/582
708/250
7,631,190 B2 * 12/2009 Walmsley ................ H04L 9/12
380/44

(Continued)

FOREIGN PATENT DOCUMENTS

WO 2015105687 A1 7/2015

OTHER PUBLICATIONS

Huang, Jingjing; Jiang, Ting. Dynamic Secret Key Generation Exploiting Ultra-Wideband Wireless Channel Characteristics. 2015 IEEE Wireless Communications and Networking Conference (WCNC). http://ieeexplore.ieee.org/stamp/stamp.jsp?arnumber=7127724.*

(Continued)

*Primary Examiner* — Jeremiah Avery

(57) ABSTRACT

A method of secure key generation includes writing a predetermined write pattern to a particular address of volatile memory, wherein the volatile memory includes bit lines; reading data from the particular address while applying a first set of operating variables to the volatile memory, subsequent to the writing; sensing a first plurality of timing mismatches during the reading, wherein sense amplifiers are coupled to the bit lines, each latch of a plurality of latches is coupled between a respective pair of sense amplifiers, and each latch is configured to output a data value that indicates a respective timing mismatch between outputs of the respective pair of sense amplifiers; and determining an entropy ratio for the particular address, wherein the entropy ratio is equivalent to a ratio of a first number of latches that output a first data value to a second number of latches that output a second data value.

20 Claims, 5 Drawing Sheets

(51) Int. Cl.
  *G11C 7/24* (2006.01)
  *G11C 29/50* (2006.01)
  *G11C 29/44* (2006.01)

(56) References Cited

U.S. PATENT DOCUMENTS

| | | | |
|---|---|---|---|
| 7,757,086 B2* | 7/2010 | Walmsley | B41J 2/17546 380/259 |
| 8,850,608 B2 | 9/2014 | Tehranipoor et al. | |
| 2007/0244950 A1* | 10/2007 | Golic | G06F 7/582 708/250 |
| 2007/0273408 A1* | 11/2007 | Golic | G06F 7/584 326/93 |
| 2008/0235796 A1* | 9/2008 | Buhr | G06F 21/75 726/22 |
| 2009/0172056 A1* | 7/2009 | Pradhan | G06F 7/588 708/255 |
| 2010/0070777 A1 | 3/2010 | Salters et al. | |
| 2011/0131263 A1* | 6/2011 | Vasyltsov | G06F 7/588 708/251 |
| 2013/0138710 A1 | 5/2013 | Yamamoto et al. | |
| 2014/0037086 A1 | 2/2014 | Seol et al. | |
| 2014/0070212 A1 | 3/2014 | Fujiwara et al. | |
| 2015/0058928 A1 | 2/2015 | Guo et al. | |
| 2015/0301802 A1* | 10/2015 | Katoh | G06F 5/01 708/190 |
| 2015/0355886 A1* | 12/2015 | Peeters | G06F 7/588 708/250 |

OTHER PUBLICATIONS

Suomalainen, Jani; Evesti, Antti; Kotelba, Adrian. Security Pairings using Physical Layer Properties of Wireless Communications. 2014 International Conference on Privacy and Security in Mobile Systems (PRISMS). http://ieeexplore.ieee.org/stamp/stamp.jsp?arnumber=6970593.*

Zhang, Le; Fong, Xuanyao; Chang, Chip-Hong; Kong, Zhi Hui; Roy, Kaushik. Optimizing Emerging Nonvolatile Memories for Dual-Mode Applications: Data Storage and Key Generator. http://ieeexplore.ieee.org/stamp/stamp.jsp?arnumber=7097003.*

Zhang, Ya-ling; Han, Zhao-guo; Ren, Jiao-xia. A Network Anomaly Detection Method Based on Relative Entropy Theory. Second International Symposium on Electronic Commerce and Security, 2009. ISECS '09. http://ieeexplore.ieee.org/stamp/stamp.jsp?tp=&arnumber=5209889.*

Chang, Chip-Hong; Zhang, Li. A Blind Dynamic Fingerprinting Technique for Sequential Circuit Intellectual Property Protection. IEEE Transactions on Computer-Aided Design of Integrated Circuits and Systems. vol. 33, Issue: 1. Pub. Date: 2014. http://ieeexplore.ieee.org/stamp/stamp.jsp?tp=&arnumber=6685956.*

Xiao, K. et al., "Bit Selection Algorithm Suitable for High-Volume Production of SRAM-PUF", IEEE International Symposium on Hardware-Oriented Security and Trust (HOST), May 6-7, 2014, pp. 101-106.

Hong, M. et al., "Dynamic Encryption Key Design and Management for Memory Data Encryption in Embedded Systems", 2013 IEEE Computer Society Annual Symposium on VLSI (ISVLSI), pp. 70-75.

* cited by examiner

DATA PROCESSING SYSTEM WITH SECURE KEY GENERATION

BACKGROUND

Field

This disclosure relates generally to data processing systems, and more specifically, to data processing systems with secure key generation.

Related Art

Security has become increasingly important in semiconductor chip technology. For example, billions of dollars are lost each year due to counterfeiting. Therefore, it is desirable to have ways to uniquely identify a chip so that the source of the chip can be known. Also, secure applications may require the use of a security key to ensure that only secure access is made to the application. However, these chip IDs or security keys, if stored in fuses or other non-volatile memories of the chip, can be reverse engineered. Therefore, a need exists for improved secure key generation which results in a chip ID or key which cannot be physically discerned from the chip.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Random access memories, such as static random access memories (SRAM) and dynamic random access memories (DRAMs) typically include a fairly large number of skewed bits, or bits with timing mismatches, due to the manufacturing process. In one embodiment, one or more secure keys are generated based on the existence of these skewed bits. For example, a set of secure key latches can be used in which each latch has a data input from one sense amplifier of the RAM and a clock input from another sense amplifier of the RAM. The sense amplifiers themselves may also include skew which is convoluted with the skew in the data bits of the RAM. In one embodiment, a secure key enrollment routine which uses the outputs of the set of secure key latches is used to generate one or more secure keys, which may be used in secure applications or operate as a unique ID for the part.

Figure 1:
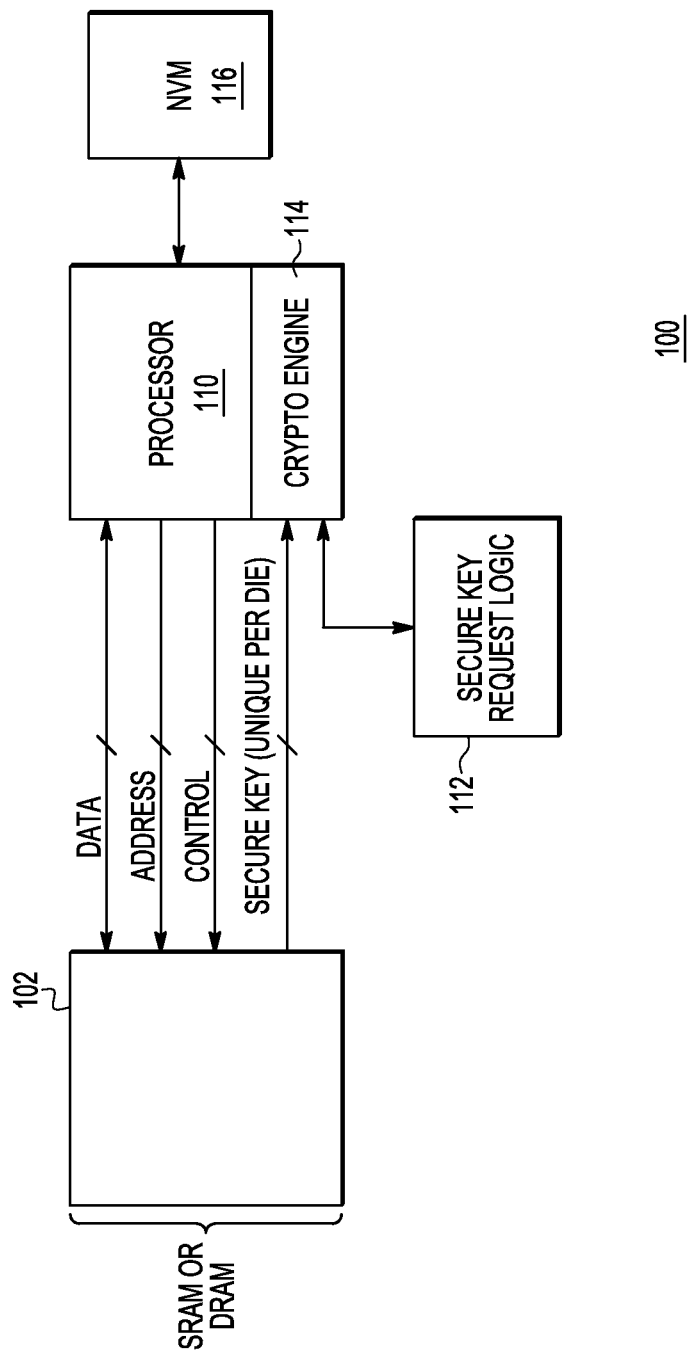
FIG. 1 illustrates, in block diagram form, a data processing system in accordance with one embodiment of the present invention.

FIG. 1 illustrates, in block diagram form, a data processing system 100 in accordance with one embodiment of the present invention. System 100 includes an SRAM 102, a processor 110, a non-volatile memory 116, and secure key request logic 112. SRAM 102 may also be a DRAM instead. However, for the discussions herein, it will be assumed that it is an SRAM. NVM 116 can be any type of non-volatile memory, such as flash. NVM 116 may also include read only memory (ROM). Processor 110 is coupled to SRAM 102, NVM 116, and secure key request logic 112. Secure key request logic 112 may be located within processor 110 or may be located within SRAM 102. Processor 110 includes cryptographic (crypto) engine 114 which is coupled to secure key request logic 112. SRAM 102 communicates data, address, and control with processor 102 to allow processor 102 to access rows in SRAM 102. SRAM 102 also provides a secure key to processor 110. This secure key is unique per die and can therefore operate as a unique ID for the part. Operation of FIG. 1 will be described in more detail in reference to FIGS. 2-6.

Figure 2:
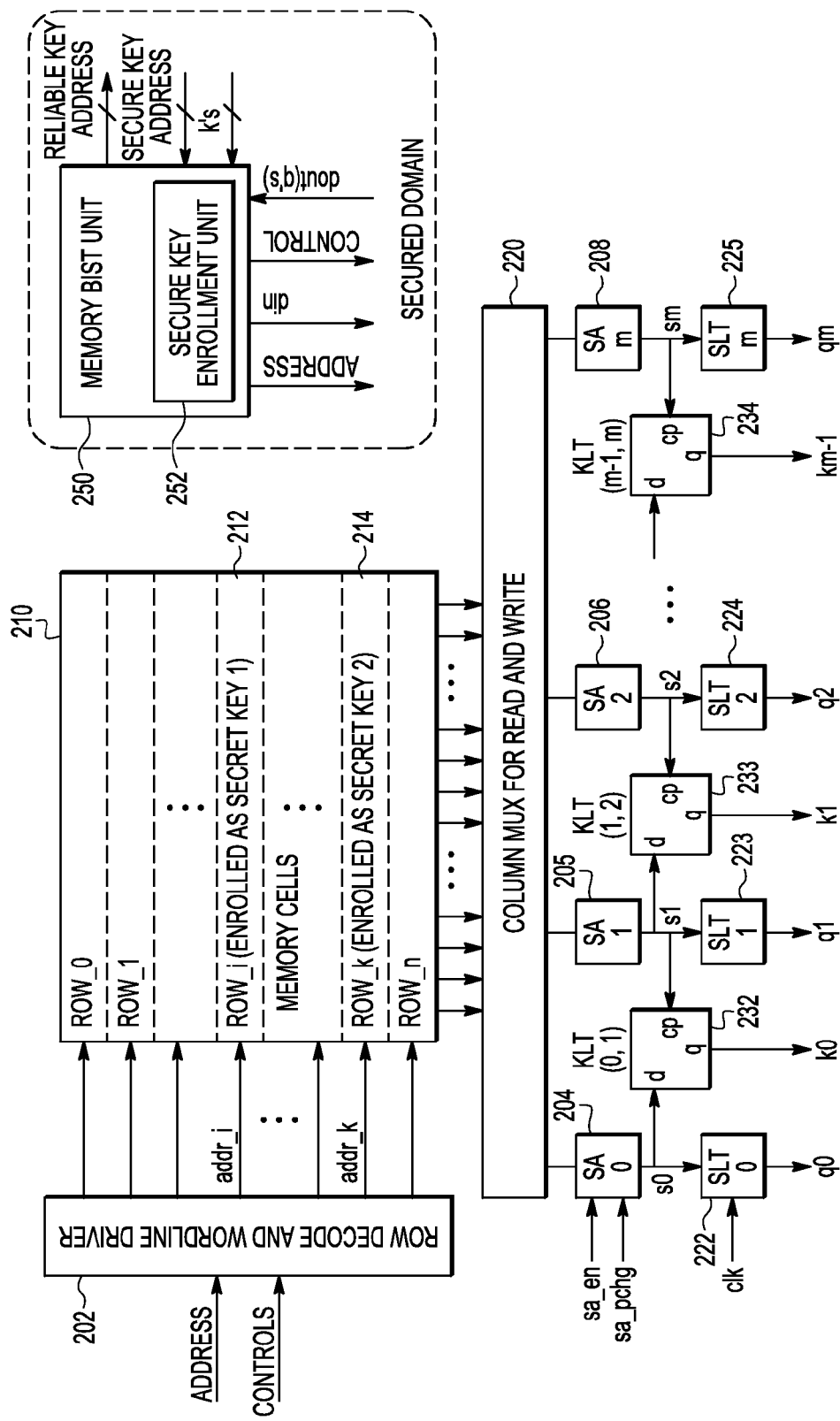
FIG. 2 illustrates, in block diagram form, the random access memory (RAM) of FIG. 1, in accordance with one embodiment of the present invention.

FIG. 2 illustrates, in block diagram form, SRAM 102 of FIG. 1, in accordance with one embodiment of the present invention. SRAM 102 includes row decode and wordline driver 202, column multiplexer (MUX) for read and write 220, a memory array 210, sense amplifiers (SAs) 204-208, sense latches (SLTs) 222-225, key latches (KLTs) 232-234, and a Built-in Self Test (BIST) unit 250. Row decode and wordline driver 204 is coupled to each row of array 210, row 0-row n, including a row i and a row k. Each column of array 210 is coupled to column MUX 220. The outputs from the columns of array 210 are multiplexed and output to m+1 sense amplifiers. Each sense amplifier receives a sense amplifier enable signal, sa_en, and a sense amplifier pre-charge signal, sa_pchg. For simplicity, only sa_en is illustrated in FIG. 2. An output of each SA, SA0-SAm, is provided to a data input of a corresponding SLT, SLT0-SLTm, respectively. Each SLT receives a clock signal, clk, and provides a corresponding output bit, q0-qm, of array 210. Each KLT receives the output of one SA at its data input, d, and the output of a different SA at its clock input, cp, and provides a key bit, k, at its data output, q. Therefore, the KLTs provide k0-km−1, which corresponds to an m-bit value.

In the illustrated embodiment, each KLT is coupled between two adjacent SAs. For example, KLT(0,1) is coupled between SA0 and SA1 such that the output of SA0, s0, is provided to the data input of KLT(0,1), the output of SA1, s1, is provided to the clock input of KLT(0,1), and the output of KLT(0,1) provides k0. Similarly, KLT(1,2) is coupled between SA1 and SA2 such that the output of SA1, s1, is provided to the data input of KLT(1,2), the output of SA2, s2, is provided to the clock input of KLT(1,2), and the output of KLT(1,2) provides k1. Therefore, in the illustrated embodiment, there is a KLT between every two adjacent SAs. KLT(m−1,m) is coupled between SAm−1 and SAm such that the output of SAm−1, sm−1, is provided to the data input of KLT(m−1,m), the output of SAm, sm, is provided to the clock input of KLT(m−1,m), and the output of KLT(m−1,m) provides km.

BIST unit 250 includes a secure key enrollment unit 252. BIST unit 250 provides addresses and controls to row decode and wordline drivers 202, provides input data, din, for writes to array 210 and receives output data, Dout, for reads from array 210. The output data corresponds to q0-qm. BIST unit 250 also provides reliable key addresses and a secure key address to processor 102, and receives the k bit values from the KLTs.

In operation during functional mode, SRAM 102 receives an address and controls from processor 102 for a read or write a memory location. A first portion of the received address is decoded by row decode decoder and wordline driver 202 and results in the wordline driver driving one of rows 0-n. A second portion of the received address is provided to column MUX 220 which couples the selected columns to SA0-SAm. For a read access, based on the value stored in the bitcell at the intersection of the selected row and selected column, the SA provides the sensed value to the SLT which latches the sensed value, either a "1" or a "0". For a write access, an input is provided to the selected columns to store and appropriate bit value into the selected bitcells (note that this part of the circuitry is not illustrated).

BIST unit 250, during normal testing, writes a known value to each row in array 210 and reads back the value to determine if the read value matches the written value. If there is a mismatch, an error is indicated.

In an SRAM, there are typically bitcells which include skew or mismatched values caused by random process variation in manufacturing of a semiconductor device. The sense amplifiers of an SRAM may also include skew or mismatched values. It is unknown, at the time of manufacture, which bitcells or sense amplifiers have significant skew. As will be described in more detail below, a secure key enrollment routine is used to determine which rows in array 210 include such bitcells whose skew, when convoluted with the skew of corresponding sense amplifiers, is statistically significant enough to result in sufficient entropy or randomness at the outputs of the KLTs. Once such rows are identified (as an example, it will be assumed that row i and row k qualify as such rows), any one of them or combination of them can be used to provide a secure key or unique id. In the illustrated embodiment, secure key enrollment unit 252 which performs the secure key enrollment routine is located with BIST unit 250. However, it could be located elsewhere within memory 202.

Figure 3:
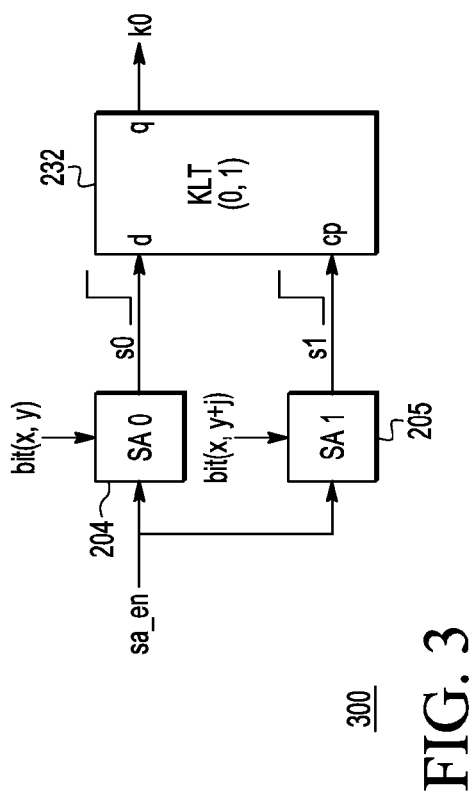
FIG. 3 illustrates, in block diagram form, a portion of the memory of the RAM of FIG. 1, in accordance with one embodiment of the present invention.

FIG. 3 illustrates an example of KLT(0,1) 232 in accordance with one embodiment of the present invention. As illustrated, each KLT includes a data input and clock input, in which an output of a first SA is provided to the data input, and an output of a second, different, SA is provided to the clock input. Therefore, each KLT is coupled to two different SAs, in which the first SA can be any of SA0-m and the second SA can be any other of SA0-m. Also, it is assumed that the KLTs are rising edge latches or D flip flops, but alternatively, may be falling edge latches or D flip flops. In the illustrated embodiment, each KLT is coupled between two adjacent SAs. Therefore, as illustrated in FIG. 3, KLT (0,1) 232 receives the output of SA0, s0, at its data input and receives the output of SA1, s1, at its clock input. SA0 receives at its data input a bit(x,y), and SA1 receives at its data input a bit (x,y+j). That is, SA0 and SA1 each receive a bit value of a same row, x, which may be spaced j bits apart, where j can be any integer value, depending on the layout of array 210.

In operation, all the SAs are reset to a known logic state before enabling (activating or triggering) the sa_en signal. This may be accomplished using the sa_pchg signals. When the SAs are enabled by sa_en, each of SA0 and SA1 provide a signal edge to the data input and clock input respectively. When a same data value is stored at the bitcells sensed by SA0 and SA1 (bit(x,y) and bit(x,y+j), respectively), both signal edges will either be a rising edge or a falling edge. In the illustrated embodiment, since it is assumed the KLTs are rising edge latches, the value stored in the sensed bitcells is one that results in a rising edge. If rising edge of S0 is faster than the rising edge of S1, then the output of KLT 232, k0, is a logic level 1. If rising edge of S1 is faster than the rising edge of S0, then the output of KLT 232, k0, is a logic level 0. Due to differences in bitcells and sense amplifiers, it is unknown what k0 will be in the case of two "competing" signal edges (rising or falling edges, depending on if rising edge or falling edge latches are used for the KLTs). Therefore, while rising edges are provided at the output of every SA, it is unknown whether each of the outputs k0 to km−1 will be a one or a zero until they are tested. Use of the KLTs and their output values will be discussed in more detail in reference to FIGS. 5 and 6 below.

Figure 4:
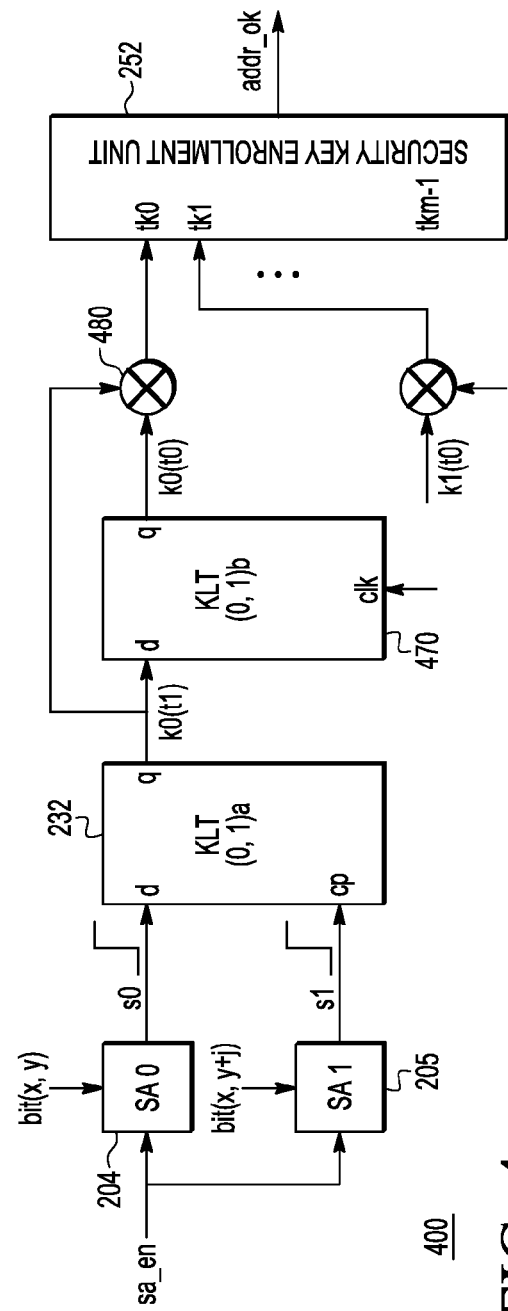
FIG. 4 illustrates, in block diagram form, a portion of the memory of the RAM of FIG. 1, in accordance with one embodiment of the present invention.

FIG. 4 illustrates an alternate embodiment which adds a second KLT for each KLT which allows for reliability testing of each KLT bit. As discussed above, once each row is tested, it can be known what the values of the k outputs are, but it is unknown whether the output value is reliable across voltage and temperature variations. That is, a reliable value is one that does not vary based on changes in one or more parameters of system 100. This reliability can be checked by BIST unit 250, as will be described below, or with the use of a second KLT for each KLT illustrated in FIG. 2. In this case, the KLTs illustrated in FIG. 4 which correspond to the KLTs in FIGS. 2 and 3 are labeled KLTa, and the second KLT is labeled as KLTb. Therefore, in FIG. 4, in which like numerals indicate like elements, a second KLT, KLTb 470, is coupled to KLTa 232.

KLTb 470 has an input coupled to the output of KLTa, and a clock input coupled to a clock signal. In one embodiment, the clock signal can be synchronized with the sa_en signal of the SAs. The output of KLTb 470 corresponds to the output, k0, at time t0. Note that the clock signal at KLTb is clocked after k0 is latched in KLTa 232 to allow k0 to propagate to KLTb. After time t0, and before a later time, t1, a parameter of system 100, such as operating voltage or temperature, is changed. Therefore, at time t1, the output of KLTa 232 provides k0 at time at time t1. Each of k0 at time t1, k0(t1), and k0 at time t0, k0(t), are provided to a comparator 480. The output of the comparator, tk0, provides an indicator as to whether the output bit, k0, is reliable. If the value of k0 before and after the change in parameter is the same, then tk0 will be asserted, and if the value of k0 before and after the change in parameter is different, then tk0 will be negated. Each of k0 to km−1 has a corresponding comparator, like comparator 480, which receives inputs from a corresponding KLTa and KLTb, and the comparators provide tk0-tkm−1 to security key enrollment unit 252. If each of tk0-tkm−1 is asserted, the value of k0-km−1 is determined to be reliable, else it is not reliable. The value of each of tk0-tkm−1 can then be used by security key enrollment unit 252 to output a reliable address indicator, addr_ok, which is asserted if each of tk0-tkm−1 is asserted. Else, addr_ok is negated.

Figure 5:
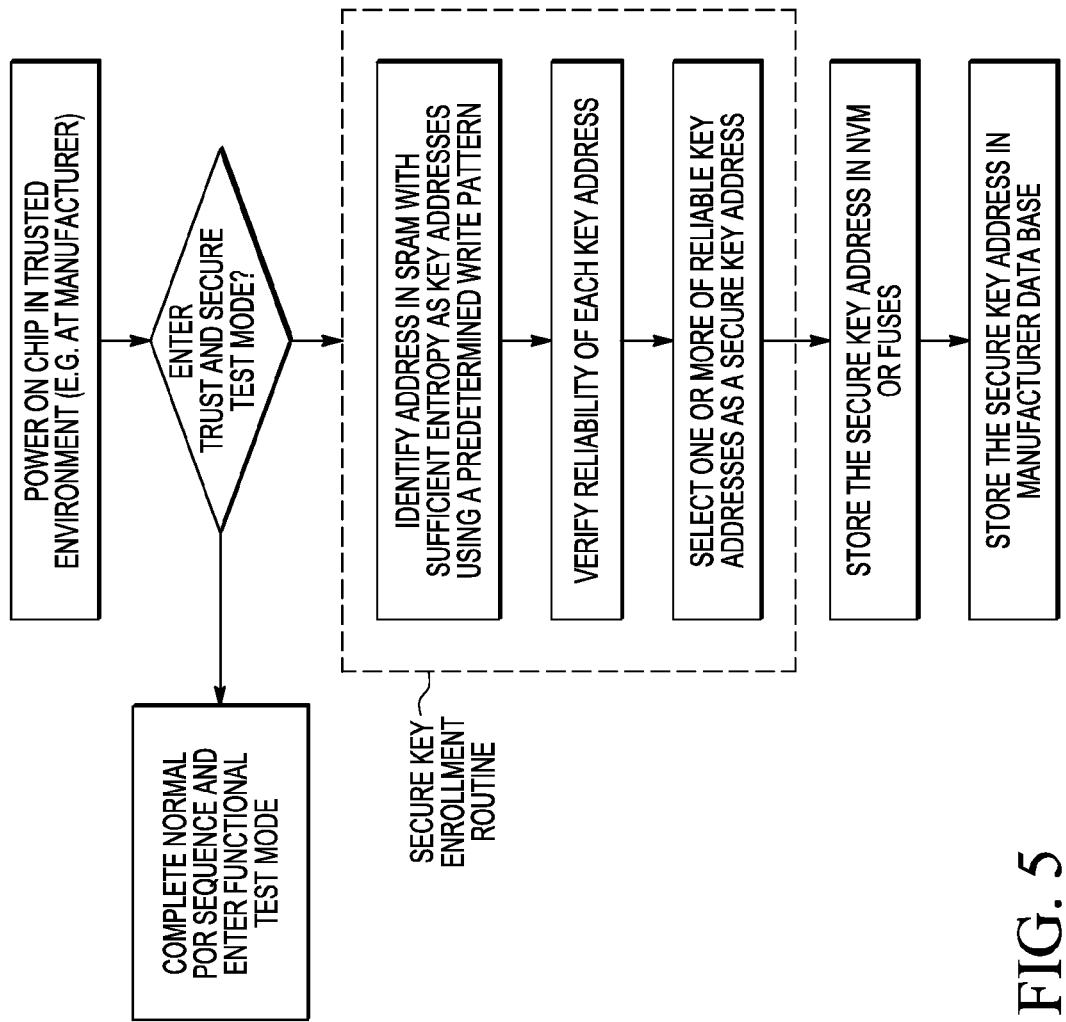
FIGS. 5 and 6 illustrate, in flow diagram form, operations within the data processing system of FIG. 1.

FIG. 5 illustrates, in flow diagram form, a method 500 within system 100, including a secure key enrollment routine, in accordance with one embodiment of the invention. Method 500 begins with block 502 in which the chip is powered on in a trusted environment. For example, this may be done by the manufacturer at the manufacturer's site. The method proceeds to decision diamond 504 in which it is determined if a trust and secure test is entered. The trust and secure mode can be a special trusted mode in which secure testing is performed or in which other secure operations are performed. If a trust and secure test mode is not entered, method 500 proceeds to block 506 in which a normal power-on-reset (POR) sequence is completed and the integrated circuit or system is placed in a functional test mode. In this mode, testing operations can be performed which may not be secure.

If, at decision diamond 504, a trust and secure test mode is entered, method 500 proceeds to a secure key enrollment routine 508. The secure key enrollment identifies rows within a memory array, such as rows i and k in array 210, which may be used to provide a secure key. Secure key enrollment routine 508 begins with block 510 in which addresses in an SRAM (or DRAM) which have sufficient entropy are identified as key addresses. This is done using a predetermined write pattern, and may be performed by BIST unit 250. For example, in one embodiment, a write pattern of all 1's is used in which, for each row of array 210, all 1's are written, and for each row written, the value of k0-km−1 is determined. Those addresses which result in sufficient entropy in the value of k0-km−1 (which may be referred to as the entropy value) are identified as key addresses. The resulting entropy is due, for example, to the timing mismatch of the addressed bitcells and the corresponding sense amplifiers. A value of k0-km−1 which has sufficient entropy is a value with sufficient randomness, such as with a sufficient ratio of 1's and 0's. The ratios of 1's to 0's may be referred to as an entropy ratio, and for the value of k0-km−1 to have sufficient entropy, it should have an entropy ratio greater than an entropy threshold. For example, in one embodiment, the entropy threshold is 40% 1's. In one embodiment, the entropy ratio should fall within a range of entropy values, such as between 40 and 60% 1's in the k0-km−1 value, to be considered as having sufficient entropy. Note that only a subset of the addresses written to in the SRAM should result in sufficient entropy and thus identified as key addresses. Key addresses therefore refer to those addresses which include sufficient skew or mismatch to result in sufficient entropy. The skew or mismatch may result from the bitcells or sense amplifiers, or a combination thereof.

After the key addresses are identified, method 500 proceeds to block 512 in which the reliability of each key address is verified. In one embodiment, this is done along with block 510 by using a second KLT such as illustrated in FIG. 4. In this embodiment, once the predetermined write pattern is written to the address and sufficient entropy results in the resulting k0-km−1 value at the output of the second KLT, a parameter of the system is changed (such as temperature or operating voltage), and, at a later time, the values at the output of the first KLT are compared to the values at the second KLT to determine reliability. If the two values are the same, then addr_ok is asserted, and that address, which has sufficient entropy and reliability is identified as a key address. If the k0-km−1 value has sufficient entropy but lacks reliability, then that address is not identified as a key address.

In another embodiment, reliability can be verified using BIST unit 250. In this embodiment, after identifying key addresses in block 510, these addresses are provided to BIST unit 250. A parameter of the system is then changed (such as temperature or operating voltage), and BIST unit 250 tests each of the previously identified key addresses to determine if the resulting value of k0-km−1 is the same as before the parameter change. If so, then reliability is verified. If not, then that particular key address is no longer identified as a key address. Note that alternate methods of determining reliability may be used.

After the reliable key addresses are determined, method 500 proceeds to block 514 where one or more of the reliable key address is selected as a secure key address. This can be done using a fuse or NVM bit. For example, a single reliable key address may be selected as the secure key address. In this example, when a secure key is needed in system 100, such as for a cryptographic application or as a unique ID, the secure key address can be written with the predetermined write pattern previously used to determine the key addressees. The resulting value of k0-km−1 is the resulting secure key. In another embodiment, more than one reliable key address may be selected as the key. For example, two reliable key addresses may be used to provide a longer secure key to enhance key strength against brute force cipher attacks.

After block 514 (after the secure key enrollment routing 508), method 500 proceeds to blocks 516 and 518. Note that these blocks may be performed in any order or simultaneously. In block 516, the secure key address or addresses identified during the secure key enrollment routing are saved somewhere in system 100, such as in NVM or fuses. For example, they can be stored in NVM 116. Note that the secure key or secure keys themselves are not stored in system 100. In block 518, the secure key address or addresses can be stored in the manufacturer's database. This is useful in the case, for example, for determining whether a particular part is counterfeit or not. For example, in the field, if a part fails, it may not be known whether the part was truly manufactured by the manufacturer or if it is a counterfeit part. The manufacturer, if he has the secure key address in his data base and has stored the resulting secure key, can access the secure key address in the SRAM with the predetermined write pattern and determine whether or not the secure key or keys match. If there is a match, the part in question can be determined to have been produced by the manufacturer. Note that in alternate embodiments, either block 516 or 518 may not be performed at all.

In one embodiment, the manufacturer may be able to read and store secure keys in their database but once the security key enrollment routine is complete, the manufacturer can blow a fuse that blocks read access to the secure key. The manufacturer can still write a pattern to the key address and hardware can internally compare the generated key with the manufacturer written key from their database, and the hardware will indicate a "pass" or "fail", in which a "fail" indicates a counterfeit part.

Figure 6:
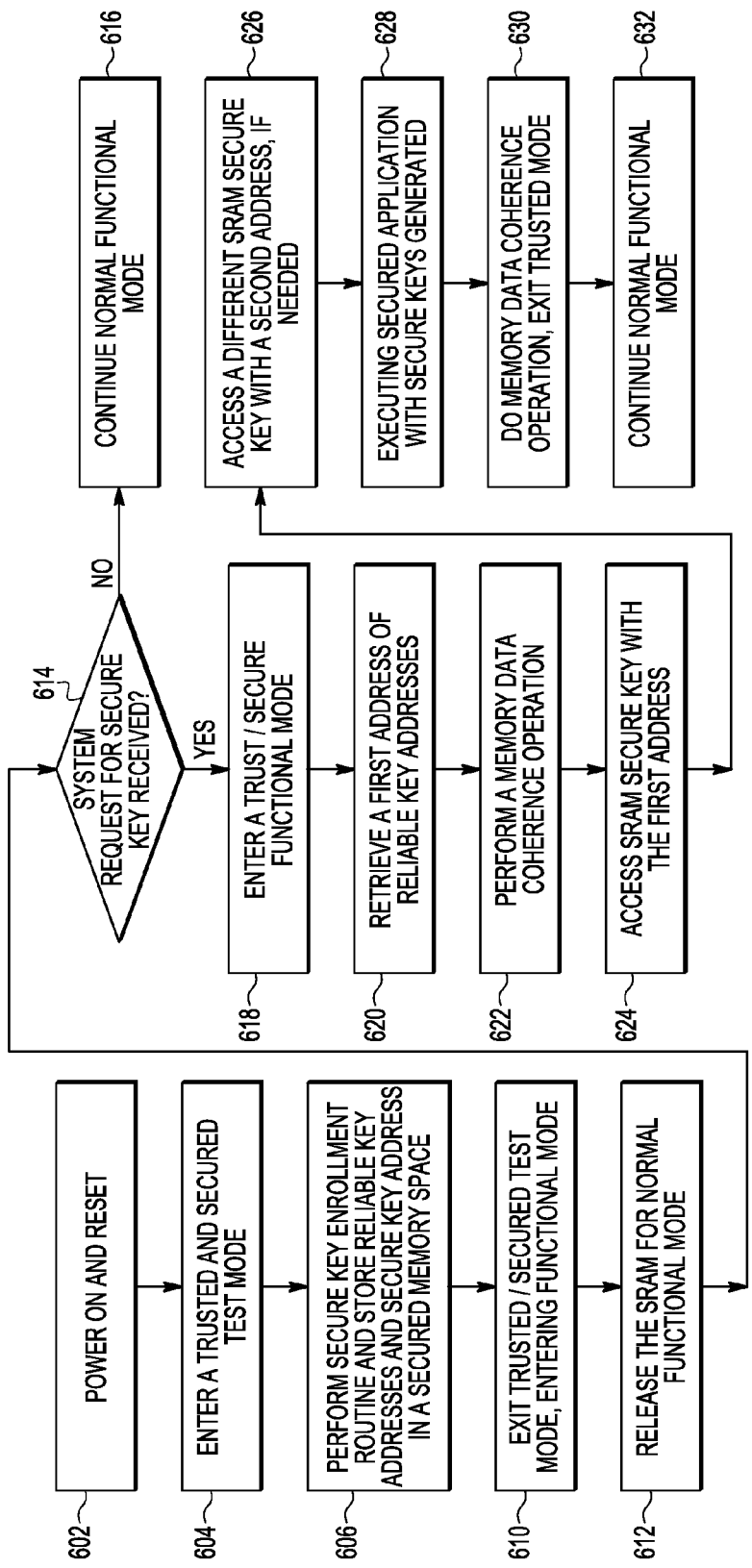

FIG. 6 illustrates in flow diagram form, a method 600 within system 100, which may be performed once system 100 is in use in the field, in accordance with one embodiment of the invention. Method 600 may be performed, for example, by system 100 once it has left the manufacturer and has been incorporated in a product. In block 602, system 100 is powered on and reset. If the secure key address determined by the manufacturer during a secure key enrollment routine was stored in NVM or fuses of system 100 (such as by block 516 in FIG. 5), then method 600 proceeds directly to block 612, in which the SRAM is used for normal function mode.

If the secure key address is not already stored in system 100, it may be determined by system 100, such as by boot code stored in a ROM of system 100. In this case, method 600 proceeds to block 604 in which the trusted and secured test mode is entered. The method then proceeds to block 606 in which the secure key enrollment routine (as was described with respect to secure key enrollment routine 508) is performed. The reliable key addresses as well as the secure key address determined by the secure key enrollment routine are stored in a secured memory space of system 100. This secured memory space may be within SRAM 102. Then, in block 610, the trusted and secured test mode is exited and a functional mode is entered. Method 600 then proceeds to block 612 in which the SRAM is released for normal functional mode. Therefore, at this point, system 100 has booted up upon reset (having the secure key address stored within the system either by the manufacturer or by the boot up routine), and system 100 now operates in normal operating mode. Note that in this embodiment, upon powering down or resetting system 100, the stored reliable key addresses and any secure keys are cleared. They can again be determined upon power up by the boot code.

During normal operating mode, method 600 determines whether a system request for a secure key has been received. For example, crypto engine 114 may require a secured key for performing a cryptographic function, such as encoding or decoding information. In this case, processor 110 may request a secure key for use by crypto engine 114. If, at decision diamond 614, a secure key has not been requested, method 600 proceeds to block 616 in which system 100 continues to operate in normal functional mode. If a secure key has been requested, method 600 proceeds to block 618.

In block 618, a trust and secure functional mode is entered, which corresponds to a trusted and secured mode during functional operation. Method 600 then proceeds to block 620 in which a first address of the reliable key addresses is retrieved for use by crypto engine 114. Note that the reliable key addresses may have been determined and saved in response to secure key enrollment routine 508 or in response to the secure key enrollment routine performed in block 606. In block 622, a memory data coherency operation is performed. Since SRAM 102 is being used for formal functional mode, it has data that needs to be stored and restored for performing the secure key operation. Therefore, the data stored at the first address is stored elsewhere within system 100, such as to another location in SRAM 102 or to registers in system 100. Method 600 proceeds to block 624 in which the first address is accessed in SRAM 102 to obtain the secure key. In this case, the predetermined write pattern is written to the first address, and the resulting k0-km−1 value provides the secure key. This secure key can then be used, as needed, by crypto engine 114, including any further manipulation. In this way, the secure key is only exposed in a secure and trusted environment for a short period of time upon a system request event. After completion of a cryptographic function, the secure key and the secure key address can be cleared.

Method 600 proceeds to block 626 in which a different SRAM secure key can be accessed with a second address of the reliable key addresses, if needed. That is, it is possible that crypto engine 114 needs multiple secure keys, and each reliable key address stored in system 100 can be used to provide a secure key. Method 600 then proceeds to block 628 in which the secured application is executed with the secure key or keys generated. For example, this secured application may be executed by crypto engine 114. The determination of the secured key or keys may be performed by secure key request logic 112.

Method 600 proceeds to block 630 in which a memory data coherence operation is performed to restore the original SRAM data. For example, any data written from any retrieved reliable key address of the SRAM to other locations is written back to the corresponding addresses. In this manner, the contents of SRAM 102 is restored to the way it was prior to entering the trust and secure functional mode. After the memory coherency operation, the trusted and secured functional mode is exited. Normal functional mode can then continue, in block 632.

Therefore, by now it can be appreciated how the skew and mismatch within an SRAM can be used to generate reliable key addresses which can provide one or more secure keys. These secure keys can be used in security applications and as unique identifiers. In one embodiment, key latches have a data input coupled to one sense amplifier and a clock input coupled to another sense amplifier. These key latches are then used by a secure key enrollment routine utilizing to determine the reliable key addresses. Note that the key latches and the secure key enrollment routine can be used in any memory system, such as an SRAM or DRAM, or in an NVM.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, rather than SRAM 102, the above descriptions apply to a DRAM as well. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a method of secure key generation for a semiconductor device includes writing a predetermined write pattern to a particular address of a volatile memory of the semiconductor device, wherein the volatile memory includes a plurality of bit lines; reading data from the particular address while applying a first set of operating variables to the volatile memory, subsequent to the writing; sensing a first plurality of timing mismatches during the reading, wherein a plurality of sense amplifiers are coupled to the plurality of bit lines, each latch of a plurality of latches is coupled between a respective pair of the plurality of sense amplifiers, and each latch is configured to output one of a first data value and a second data value to indicate a respective timing mismatch between outputs of the respective pair of sense amplifiers. The method further includes determining an entropy ratio for the particular address, wherein the entropy ratio is associated with the first set of operating variables, and the entropy ratio is equivalent to a ratio of a first number of latches that output the first data value to a second number of latches that output the second data value during the sensing. In one aspect, the method further includes selecting the particular address for inclusion in a set of key addresses of the volatile memory, in response to the entropy ratio satisfying an entropy ratio threshold. In a further aspect, the writing, the reading, the sensing, and the determining are performed as part of an enrollment routine, and output of the plurality of latches during the sensing forms an enrollment sequence of values that comprises ones of the first data value and ones of the second data value. In an even further aspect, the method further includes storing the enrollment sequence of values associated with the particular address, in response to the entropy ratio satisfying the entropy ratio threshold. In another further aspect, the method further includes performing a reliability test on a key address of the set of key addresses, wherein the performing the reliability test includes: writing the predetermined write pattern to the key address, reading data from the key address while applying a second set of operational variables to the volatile memory, subsequent to the writing to the key address, wherein the second set of operational variables is different from the first set of operational variables, and sensing a second plurality of timing mismatches during the reading data from the key address, wherein output of the plurality of latches during the sensing the second plurality of timing mismatches forms a reliability sequence of values. In a further aspect, the method further includes selecting the key address for inclusion in a set of reliable key addresses, in response to the reliability sequence of values matching a previously determined enrollment sequence of values associated with the key address. In yet a further aspect, the method further includes selecting at least one secure key address from the set of reliable key addresses, wherein the at least one secure key address is utilized to generate a secure key. In yet a further aspect, the method further includes storing the at least one secure key address in at least one of a non-volatile memory of the semiconductor device, a plurality of fuses of the semiconductor device, and a manufacturing database that stores information associated with a plurality of semiconductor devices. In another aspect of the above embodiment, the method further includes receiving a request for a secure key; retrieving one or more secure key addresses locally stored on the semiconductor device, wherein each of the one or more secure key addresses corresponds to a specific address of the volatile memory of the semiconductor device; performing a memory data coherence operation for the one or more secure key addresses of the volatile memory; generating the secure key, utilizing the one or more secure key addresses; and performing another memory data coherence operation for the one or more secure key addresses of the volatile memory. In a further aspect, the generating the secure key includes, for each of the one or more secure key addresses, writing the predetermined write pattern to a secure key address, reading data from the secure key address while applying the first set of operational variables to the volatile memory, subsequent to the writing to the secure key address, and sensing a second plurality of timing mismatches during the reading data from the secure key address, wherein output of the plurality of latches during the sensing associated with the secure key address forms a security sequence of values, and the secure key is generated based on a combination of the security sequence of values of each of the one or more secure key addresses. In another aspect of the above embodiment, each respective pair of sense amplifiers comprises a first sense amplifier and a second sense amplifier, each latch outputs the first data value in response to an output of the first sense amplifier being faster than an output of the second sense amplifier, and each latch outputs the second data value in response to the output of the first sense amplifier not being faster than the output of the second sense amplifier. In another aspect of the above embodiment, the first set of operating variables comprises at least one of a first operating voltage and a first operating temperature. In another aspect of the above embodiment, the respective timing mismatch comprises at least one of a first timing mismatch associated with the plurality of sense amplifiers, a second timing mismatch associated with control logic of the volatile memory, and a third timing mismatch associated with bitcells of the volatile memory.

In another embodiment, a semiconductor device includes a volatile memory comprising a plurality of bit lines; a plurality of sense amplifiers coupled to the plurality of bit lines; a plurality of latches, wherein each latch of the plurality of latches is respectively coupled between a respective pair of the plurality of sense amplifiers; and a memory test unit coupled to the volatile memory and to the plurality of latches, wherein the memory test unit is configured to trigger a first write operation to write a predetermined write pattern to a particular address of the volatile memory, trigger a first read operation to read data from the particular address, subsequent to the first write operation, wherein a first set of operating variables are applied to the volatile memory during the first read operation, receive outputs of the plurality of latches during the first read operation, wherein each latch is configured to output one of a first data value and a second data value to indicate a respective timing mismatch between outputs of the respective pair of sense amplifiers, and determine an entropy ratio for the particular address, based on the outputs of the plurality of latches, wherein the entropy ratio is associated with the first set of operating variables, and the entropy ratio is equivalent to a ratio of a first number of latches that output the first data value to a second number of latches that output the second data value. In one aspect of the above another embodiment, the memory test unit is further configured to select the particular address for inclusion in a set of key addresses of the volatile memory, in response to satisfaction of an entropy ratio threshold by the entropy ratio. In another aspect, the memory test unit is further configured to perform a reliability test on a key address of the set of key addresses, wherein the memory test unit is further configured to trigger a second write operation to write the predetermined write pattern to the key address, trigger a second read operation to read data from the key address, subsequent to the second write operation, wherein a second set of operating variables are applied to the volatile memory during the second read operation, and the second set of operating variables is different from the first set of operating variables, receive outputs of the plurality of latches during the second read operation, wherein output of the plurality of latches during the second read operation forms a reliability sequence of values. In yet a further aspect, memory test unit is further configured to select the key address for inclusion in a set of reliable key addresses, in response to a match between the reliability sequence of values and a previously determined enrollment sequence of values associated with the key address, wherein the enrollment sequence of values was formed during a previous first read operation, and select at least one secure key address from the set of reliable key addresses, wherein the at least one secure key address is utilized to generate a secure key. In another aspect of the another embodiment, the memory test unit is further configured to receive a request for a secure key, retrieve one or more secure key addresses locally stored on the semiconductor device, wherein each of the one or more secure key addresses corresponds to a specific address of the volatile memory of the semiconductor device, trigger a memory data coherence operation for the one or more secure key addresses of the volatile memory; generate the secure key, based on the one or more secure key addresses; and trigger another memory data coherence operation for the one or more secure key addresses of the volatile memory. In a further aspect, the memory test unit is further configured to, for each of the one or more secure key addresses, trigger a second write operation to write the predetermined write pattern to a secure key address, trigger a second read operation to read data from the secure key address, subsequent to the second write operation, wherein the first set of operational variables are applied to the volatile memory during the second read operation, receive outputs of the plurality of latches during the second read operation, wherein output of the plurality of latches during the second read operation forms a security sequence of values, and the secure key is generated based on a combination of the security sequence of values of each of the one or more secure key addresses.

In yet another embodiment, a semiconductor device includes a memory having a plurality of bit lines; a plurality of sense amplifiers coupled to the plurality of bit lines; and a plurality of latches, wherein each latch of the plurality of latches is coupled between a respective pair of the plurality of sense amplifiers, each of the plurality of latches has a respective data input coupled to an output of a first sense amplifier of the respective pair of sense amplifiers, has a respective clock input coupled to an output of a second sense amplifier of the respective pair of sense amplifiers, and has a respective output, and each latch is configured to output an entropy data value based on a timing mismatch of the respective data input and the respective clock input.

What is claimed is:

1. A method of secure key generation for a semiconductor device, the method comprising:
    writing a predetermined write pattern to a particular address of a volatile memory of the semiconductor device, wherein the volatile memory comprises a plurality of bit lines;
    reading data from the particular address while applying a first set of operating variables to the volatile memory, subsequent to the writing;
    sensing a first plurality of timing mismatches during the reading, wherein
        a plurality of sense amplifiers are coupled to the plurality of bit lines,
        each latch of a plurality of latches is coupled between a respective pair of the plurality of sense amplifiers, and
        each latch is configured to output one of a first data value and a second data value to indicate a respective timing mismatch between outputs of the respective pair of sense amplifiers;
    determining an entropy ratio for the particular address, wherein
        the entropy ratio is associated with the first set of operating variables, and
        the entropy ratio is equivalent to a ratio of a first number of latches that output the first data value to a second number of latches that output the second data value during the sensing; and
    blowing a fuse of the semiconductor device to select the particular address as a key address based on the entropy ratio satisfying an entropy ratio threshold.

2. The method of claim 1, further comprising:
    selecting the particular address for inclusion in a set of key addresses of the volatile memory, in response to the entropy ratio satisfying the entropy ratio threshold.

3. The method of claim 2, wherein
the writing, the reading, the sensing, and the determining are performed as part of an enrollment routine, and
output of the plurality of latches during the sensing forms an enrollment sequence of values that comprises ones of the first data value and ones of the second data value.

4. The method of claim 3, further comprising:
storing the enrollment sequence of values associated with the particular address, in response to the entropy ratio satisfying the entropy ratio threshold.

5. The method of claim 2, further comprising:
performing a reliability test on a key address of the set of key addresses, wherein the performing the reliability test comprises:
   writing the predetermined write pattern to the key address,
   reading data from the key address while applying a second set of operational variables to the volatile memory, subsequent to the writing to the key address, wherein
      the second set of operational variables is different from the first set of operational variables, and
   sensing a second plurality of timing mismatches during the reading data from the key address, wherein
      output of the plurality of latches during the sensing the second plurality of timing mismatches forms a reliability sequence of values.

6. The method of claim 5, further comprising:
selecting the key address for inclusion in a set of reliable key addresses, in response to the reliability sequence of values matching a previously determined enrollment sequence of values associated with the key address.

7. The method of claim 6, further comprising:
selecting at least one secure key address from the set of reliable key addresses, wherein the at least one secure key address is utilized to generate a secure key.

8. The method of claim 7, further comprising:
storing the at least one secure key address in at least one of a non-volatile memory of the semiconductor device, and a manufacturing database that stores information associated with a plurality of semiconductor devices.

9. The method of claim 1, further comprising:
receiving a request for a secure key;
retrieving one or more secure key addresses locally stored on the semiconductor device, wherein
   each of the one or more secure key addresses corresponds to a specific address of the volatile memory of the semiconductor device;
performing a memory data coherence operation for the one or more secure key addresses of the volatile memory;
generating the secure key, utilizing the one or more secure key addresses; and
performing another memory data coherence operation for the one or more secure key addresses of the volatile memory.

10. The method of claim 9, wherein the generating the secure key comprises: for each of the one or more secure key addresses:
   writing the predetermined write pattern to a secure key address,
   reading data from the secure key address while applying the first set of operational variables to the volatile memory, subsequent to the writing to the secure key address, and
   sensing a second plurality of timing mismatches during the reading data from the secure key address, wherein
      output of the plurality of latches during the sensing associated with the secure key address forms a security sequence of values, and
   the secure key is generated based on a combination of the security sequence of values of each of the one or more secure key addresses.

11. The method of claim 1, wherein
each respective pair of sense amplifiers comprises a first sense amplifier and a second sense amplifier,
each latch outputs the first data value in response to an output of the first sense amplifier being faster than an output of the second sense amplifier, and
each latch outputs the second data value in response to the output of the first sense amplifier not being faster than the output of the second sense amplifier.

12. The method of claim 1, wherein the first set of operating variables comprises at least one of a first operating voltage and a first operating temperature.

13. The method of claim 1, wherein the respective timing mismatch comprises at least one of a first timing mismatch associated with the plurality of sense amplifiers, a second timing mismatch associated with control logic of the volatile memory, and a third timing mismatch associated with bit-cells of the volatile memory.

14. A semiconductor device comprising:
a volatile memory comprising a plurality of bit lines;
a plurality of sense amplifiers coupled to the plurality of bit lines;
a plurality of latches, wherein
   each latch of the plurality of latches is respectively coupled between a respective pair of the plurality of sense amplifiers; and
a memory test unit coupled to the volatile memory and to the plurality of latches, wherein the memory test unit is configured to:
   trigger a first write operation to write a predetermined write pattern to a particular address of the volatile memory,
   trigger a first read operation to read data from the particular address, subsequent to the first write operation, wherein
      a first set of operating variables are applied to the volatile memory during the first read operation,
   receive outputs of the plurality of latches during the first read operation, wherein
      each latch is configured to output one of a first data value and a second data value to indicate a respective timing mismatch between outputs of the respective pair of sense amplifiers,
   determine an entropy ratio for the particular address, based on the outputs of the plurality of latches, wherein
      the entropy ratio is associated with the first set of operating variables, and
      the entropy ratio is equivalent to a ratio of a first number of latches that output the first data value to a second number of latches that output the second data value; and
a fuse associated with the particular address, the fuse to be blown to select the particular address as a key address based on the entropy ratio satisfying an entropy ratio threshold.

15. The semiconductor device of claim 14, wherein the memory test unit is further configured to:

select the particular address for inclusion in a set of key addresses of the volatile memory, in response to satisfaction of the entropy ratio threshold by the entropy ratio.

16. The semiconductor device of claim 15, wherein the memory test unit is further configured to:
perform a reliability test on a key address of the set of key addresses, wherein the memory test unit is further configured to:
trigger a second write operation to write the predetermined write pattern to the key address,
trigger a second read operation to read data from the key address, subsequent to the second write operation, wherein
a second set of operating variables are applied to the volatile memory during the second read operation, and
the second set of operating variables is different from the first set of operating variables,
receive outputs of the plurality of latches during the second read operation, wherein
output of the plurality of latches during the second read operation forms a reliability sequence of values.

17. The semiconductor device of claim 16, wherein the memory test unit is further configured to:
select the key address for inclusion in a set of reliable key addresses, in response to a match between the reliability sequence of values and a previously determined enrollment sequence of values associated with the key address, wherein the enrollment sequence of values was formed during a previous first read operation, and
select at least one secure key address from the set of reliable key addresses, wherein the at least one secure key address is utilized to generate a secure key.

18. The semiconductor device of claim 14, wherein the memory test unit is further configured to:
receive a request for a secure key,
retrieve one or more secure key addresses locally stored on the semiconductor device, wherein
each of the one or more secure key addresses corresponds to a specific address of the volatile memory of the semiconductor device,
trigger a memory data coherence operation for the one or more secure key addresses of the volatile memory;
generate the secure key, based on the one or more secure key addresses; and
trigger another memory data coherence operation for the one or more secure key addresses of the volatile memory.

19. The semiconductor device of claim 18, wherein the memory test unit is further configured to:
for each of the one or more secure key addresses:
trigger a second write operation to write the predetermined write pattern to a secure key address,
trigger a second read operation to read data from the secure key address, subsequent to the second write operation, wherein
the first set of operational variables are applied to the volatile memory during the second read operation,
receive outputs of the plurality of latches during the second read operation, wherein
output of the plurality of latches during the second read operation forms a security sequence of values, and
the secure key is generated based on a combination of the security sequence of values of each of the one or more secure key addresses.

20. A semiconductor device comprising:
a memory comprising a plurality of bit lines;
a plurality of sense amplifiers coupled to the plurality of bit lines; and
a plurality of latches, wherein
each latch of the plurality of latches is coupled between a respective pair of the plurality of sense amplifiers,
each of the plurality of latches has a respective data input coupled to an output of a first sense amplifier of the respective pair of sense amplifiers, has a respective clock input coupled to an output of a second sense amplifier of the respective pair of sense amplifiers, and has a respective output, and
each latch is configured to output an entropy data value based on a timing mismatch of the respective data input and the respective clock input.

* * * * *